C. H. JOCKMUS.
WIND SHIELD HINGE.
APPLICATION FILED APR. 3, 1912.
1,069,956.
Patented Aug. 12, 1913.
2 SHEETS—SHEET 1.
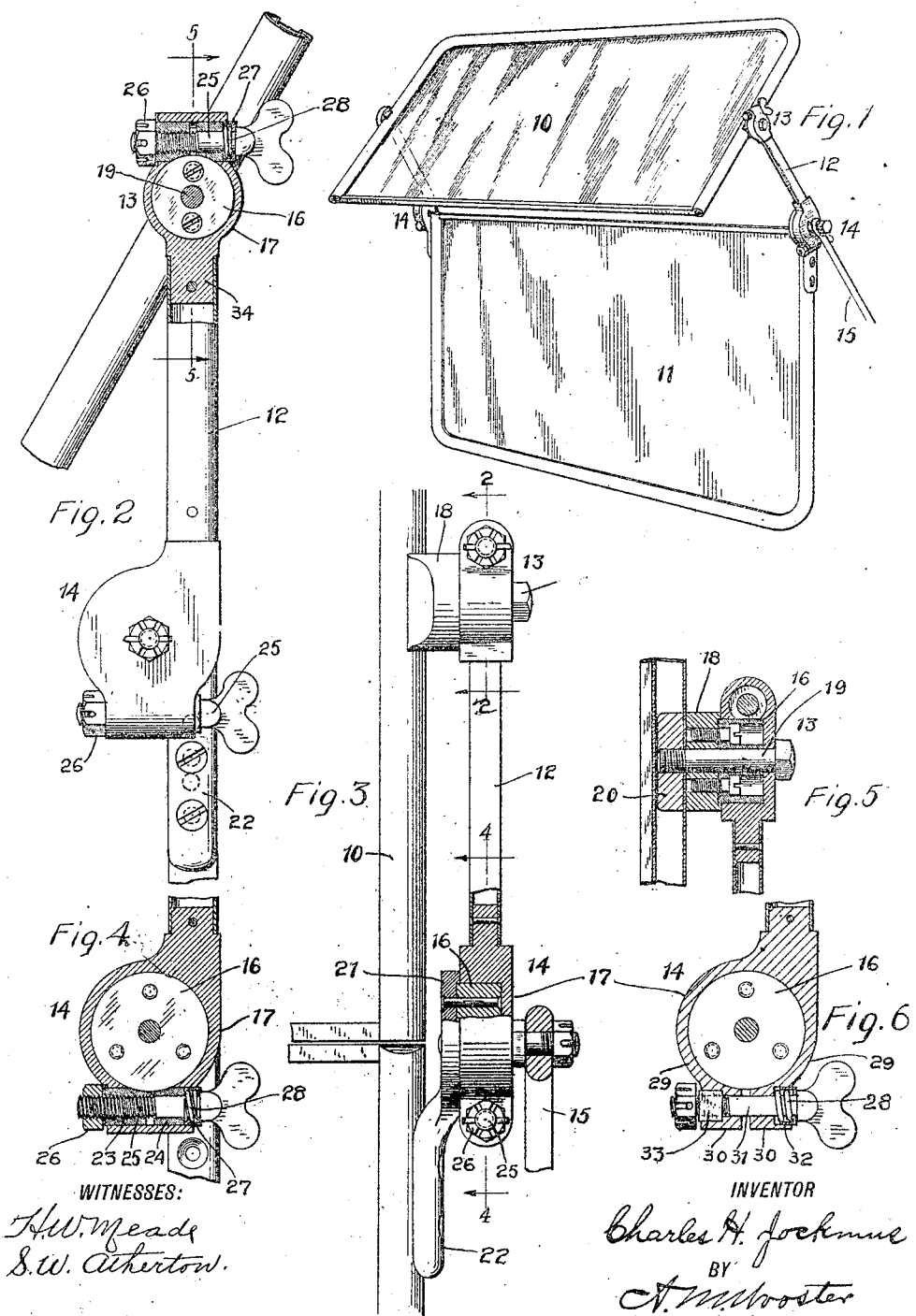
WITNESSES:
H. W. Meade
S. W. Atherton
INVENTOR
Charles H. Jockmus
BY
A. M. Wooster
ATTORNEY C. H. JOCKMUS.
WIND SHIELD HINGE.
APPLICATION FILED APR. 3, 1912.
1,069,956.
Patented Aug. 12, 1913.
2 SHEETS—SHEET 2.
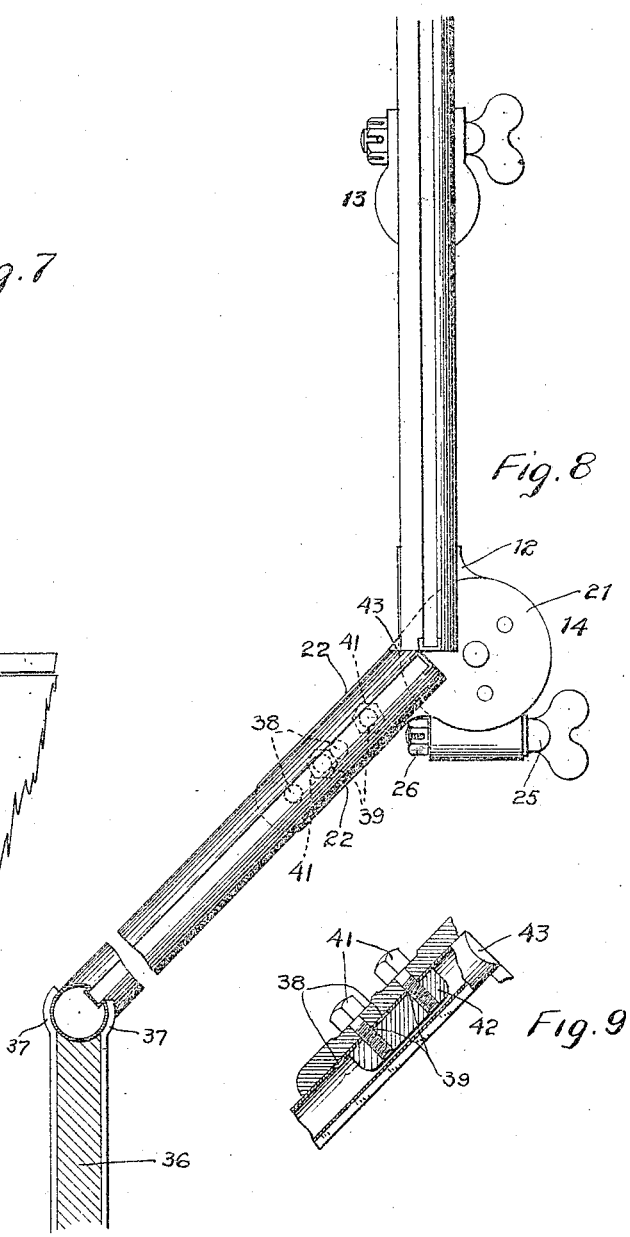

UNITED STATES PATENT OFFICE.

CHARLES H. JOCKMUS, OF ANSONIA, CONNECTICUT.

WIND-SHIELD HINGE.

1,069,956.

Specification of Letters Patent.    Patented Aug. 12, 1913.

Application filed April 3, 1912. Serial No. 668,176.

*To all whom it may concern:*

Be it known that I, CHARLES H. JOCKMUS, a citizen of the United States, residing at Ansonia, county of New Haven, State of Connecticut, have invented an Improvement in Wind-Shield Hinges, of which the following is a specification.

This invention has for its object to provide a hinge adapted for general use upon wind shields and especially adapted for use upon the type of wind shields in which the upper member is carried by a swinging arm, my novel hinge being adapted to connect the upper member to the swinging arm and also to connect the swinging arm to the lower member in such a manner as to permit the retaining pressure upon the upper member to be relieved to a predetermined minimum and which will prevent the upper member at such predetermined minimum of pressure from falling over and breaking the glass of the lower member.

With these and other objects in view, I have devised the novel wind shield hinge which I will now describe, referring to the accompanying drawings forming a part of this specification and using reference characters to indicate the several parts:

Figure 1 is a perspective of a wind shield illustrating the use of my novel hinge, the lower member of the shield being in the ordinary position, the swinging arms inclined backward and the upper member inclined forward; Fig. 2, a side elevation on an enlarged scale showing the upper and lower hinges, the swinging arm and portions of the wind shield members in edge view, the swinging arm being in the vertical position and the upper hinge in section on the line 2—2 in Fig. 3, looking in the direction of the arrows; Fig. 3, an elevation partly in section, as seen from the right in Fig. 2, the upper shield member being in the vertical position; Fig. 4, a section of the lower hinge on the line 4—4 in Fig. 3, looking in the direction of the arrows; Fig. 5, a section of the upper hinge on the line 5—5 in Fig. 2, looking in the direction of the arrows; Fig. 6, a sectional view corresponding with Fig. 4 and showing a modification in the details of construction; Fig. 7, an elevation showing the use of my novel hinge in attaching a one-piece shield carried by swinging arms to a filler-in board; Fig. 8, an elevation as seen from the reverse point of view from Fig. 2, showing the lower member in the zigzag position, so called, the glasses being removed; and Fig. 9 is a detail sectional view of the upper end of the lower frame.

10 denotes the upper member of a wind shield, 11 the lower member, 12 the swinging arms, 13 the upper hinge, 14 the lower hinge, and 15 a brace rod extending from the lower hinge to a fixed portion of the car (not shown). The essential features of the hinge are the same whether it is used for attaching the upper member to the swinging arms or the swinging arms to a lower member or to a filler-in board, but the means for attaching the hinge must necessarily vary in hinges for different uses.

Each hinge comprises a hub 16 and a box 17 which incloses the hub. The hub of the upper hinge is rigidly secured to a block 18 which is itself rigidly secured to the frame of the upper member. The box is secured to a swinging arm and turns on the hub being retained in place thereon by a screw 19 which passes through the box, hub and block and into the frame and engages a nut 20 therein. The hub of the lower hinge is secured to a head 21 on an arm 22 which is rigidly secured to the frame of the lower shield member.

In the form illustrated in Figs. 2, 3 and 4, the box is provided on one side with a transverse hole which receives gripping blocks 23 and 24. A screw 25 passes freely through one of these blocks, is threaded to engage the other block and is provided at its end with a castellated nut 26 to limit its outward movement. This castellated nut serves as a stop and renders it impossible to reduce the pressure of the spring below a predetermined minimum. That is, it prevents the screw from being turned outward far enough to relieve the pressure of the spring sufficiently to permit the hinge members to turn freely and prevents the upper member from falling over and breaking the glass of the lower member. In brief, it makes the structure fool proof. The gripping blocks are provided with concave engaging faces which bear against the hub and also act to hold the blocks against rotation. 28 denotes a relatively strong spring, the ends of which bear respectively against clamping block 24 and a cup 27 which, in turn, bears against a shoulder on the screw. By turning the screw inward the gripping blocks will be drawn toward each other and the tension of the spring increased. In practice, the springs are made strong enough to force the gripping blocks against the hubs with sufficient power to retain the movable hinge members and with them the swinging arms or shield members to which they are attached, in any position in which they may be placed. Should a positive lock be required, the screws are turned inward far enough to set the springs and to force the blocks positively into engagement with the hubs.

In the form illustrated in Fig. 6, the box which incloses the hub consists of spring arms 29 having heads 30 through which the screw 31 passes. One of the heads is provided with a socket 32 which receives the cup and a spring 28 bearing against the bases of the socket and the cup respectively. The other arm is provided with a socket which receives a nut 33 which is engaged by a screw 31 passing through both heads. The spring in this form acts to clamp the inner walls of the heads against the hub in the same manner that the gripping blocks engage it in the other form.

The swinging arms are tubes and the corresponding hinge members are provided with hubs 34 which tightly engage the ends of the tubes, as clearly shown in Figs. 2 and 7. Where one member of a shield is attached to a filler-in board, head 21 of the lower hinge has formed integral therewith a clip 35 which is bolted directly to the filler-in board, indicated by 36 (see Fig. 7). Where a two member shield is used, it should be attached to the filler-in board in some way that will permit the lower member to be changed from the vertical to the zigzag position or vice versa. For this purpose I preferably use the wind shield clamp described and claimed in my Patent Number 1,015,386, dated January 23, 1912, and which, in the present instance, I have indicated by 37. In order that the shield members may be retained in engagement, that is, so that there may be no open joint between the shield members in either the zigzag or ordinary position, I provide screw holes indicated by 38 and 39 in the frame of the lower shield member and attach the lower hinge to the lower shield member by means of the arm 22 which extends from one member of the hinge and covers the holes. This arm is secured to the frame of the lower shield member by screws 41 which pass either through holes 38 or 39 and engage a block 42 lying within the frame. When the members are to be locked in the ordinary or vertical position, screws 41 are passed through holes 38 and the inner ends of the frames of the upper and lower shield members will lie close together. In order to provide for the inclined or zigzag position of the lower member, as in Fig. 8, I bevel the ends of the frame of the lower member, as at 43. In changing from the ordinary to the zigzag position, screws 41 are removed from holes 38 and are passed through holes 39. The lower ends of the frame of the upper member in the adjusted position will lie in engagement with the bevels, as clearly shown in Fig. 8, and an open joint between the shield members will be avoided.

Having thus described my invention, I claim:

1. A hinge of the character described comprising a hub, a box adapted to turn on the hub, and provided with a transverse hole, gripping blocks in the hole which engage the hub, a screw passing freely through one block and having threaded engagement with the other, a spring bearing against the screw and the unthreaded block and an independently adjustable locking stop nut on the screw, for the purpose set forth.

2. A hinge of the character described comprising a hub, a box adapted to turn on the hub and provided with a transverse hole, gripping blocks in said hole bearing on the hub, a screw provided with a shoulder and passing freely through one block and engaging the other, a cup bearing against the shoulder, a spring socketed in the cup and bearing against the unthreaded block and an adjustable locking stop nut on the screw.

In testimony whereof I affix my signature in presence of two witnesses.

CHARLES H. JOCKMUS.

Witnesses:
GEORGE T. SAMPSON,
FRED W. FISHER.